United States Patent [19]

Gilvydis

[11] Patent Number: 4,518,990
[45] Date of Patent: May 21, 1985

[54] OBSERVATION SYSTEM FOR MILITARY VEHICLES

[75] Inventor: Jaunutis B. Gilvydis, Oakland, Mich.

[73] Assignee: The United States of America as represented by the Secretary of the Army, Washington, D.C.

[21] Appl. No.: 512,516

[22] Filed: Jul. 11, 1983

[51] Int. Cl.³ .................. H04N 7/18; H04N 5/26
[52] U.S. Cl. .................. 358/87; 89/41.15; 358/108
[58] Field of Search ............ 358/108, 229, 100, 87, 358/210; 89/41 TV

[56] References Cited

U.S. PATENT DOCUMENTS

| | | | |
|---|---|---|---|
| 2,359,032 | 9/1944 | Gott | 358/108 |
| 2,587,018 | 2/1952 | Weisfeldt | 358/108 |
| 3,229,576 | 1/1966 | Rees | 358/108 |
| 3,309,962 | 3/1967 | Lykam | 89/41 E |
| 3,505,465 | 4/1970 | Rees | 89/41 TV |
| 3,689,695 | 9/1972 | Rosenfield | 358/108 |

*Primary Examiner*—Howard W. Britton
*Attorney, Agent, or Firm*—Peter A. Taucher; John E. McRae; Robert P. Gibson

[57] ABSTRACT

Disclosed is an observation system for military land vehicles, comprising three television cameras and associated receivers. A first camera is located on a forward area of the vehicle for enabling the driver to view the area in the vehicle path. A second television camera is located in a protected area beneath the main gun; the gunner can use the second camera to train the gun on enemy targets. A third television camera is located at an elevated point on one of the trunnion walls for the main gun; the commander uses the third camera to search out new targets and enemy forces.

3 Claims, 4 Drawing Figures

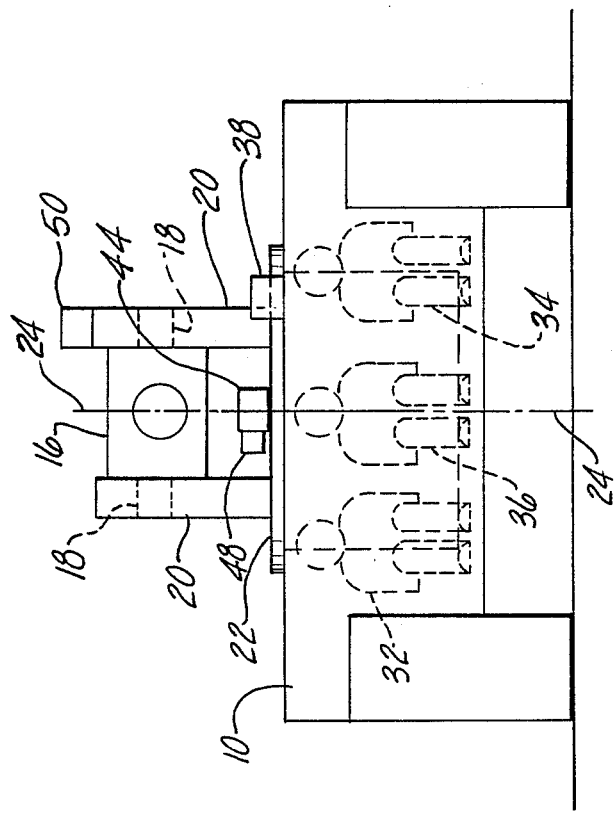
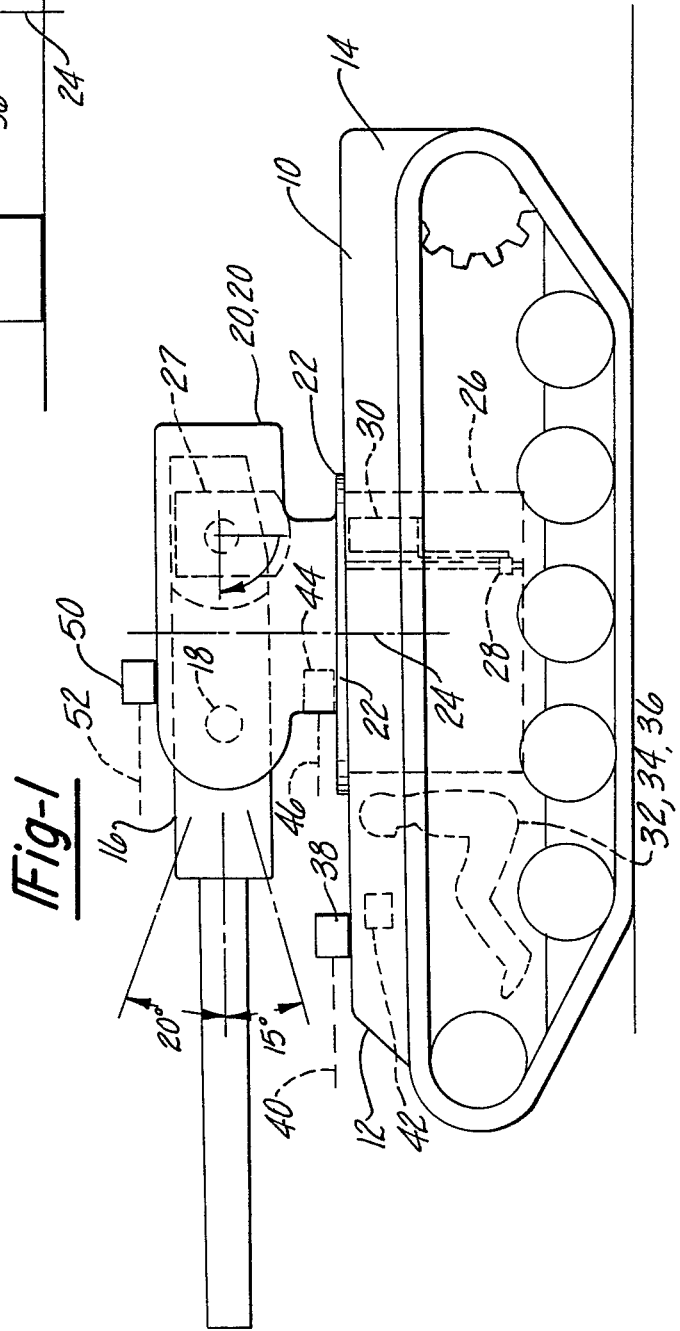

OBSERVATION SYSTEM FOR MILITARY VEHICLES

GOVERNMENT INTEREST

The invention described herein may be manufactured, used, and licensed by or for the Government for governmental purposes without payment to me of any royalty thereon.

SUMMARY OF THE INVENTION

This invention relates to observation systems for military ground vehicles. The invention may be considered as an improvement on systems shown in U.S. Pat. No. 3,505,465 issued to D. W. Rees on Apr. 7, 1970. The present invention provides a terrain-viewing system that includes at least two separate television cameras and at least two separate television receivers. Cable connections and selector switches are incorporated into the system so that the commander and the gunner can simultaneously utilize the same camera or different cameras in the system.

Principal objects of the invention are to provide a television camera-type terrain observation system for a military vehicle wherein:

1. the system permits wider more complete views of the terrain, compared to views obtainable with conventional vision blocks;
2. the system has observation redundancy for enabling one crewman to take over the task of another crewman in emergency situations;
3. the system has desired features of zoom lens capability, enhanced image-background contrast, and panoramic viewing capability;
4. the system permits the commander and gunner to cooperatively detect and track multiple targets with minimum confusion and time loss.
5. the system provides electric target location signals that are usable by a ballistic computer to store target location information for later tracking use in multiple target track situations.
6. the system permits human technicians to be seated remote from the television cameras, thereby enabling the vehicle designer a wider choice when selecting where each individual is to sit in the vehicle.

THE DRAWINGS

FIG. 1 is a side elevational view of a military vehicle embodying my invention.

FIG. 2 is a front view of the FIG. 1 vehicle.

Figure 3:
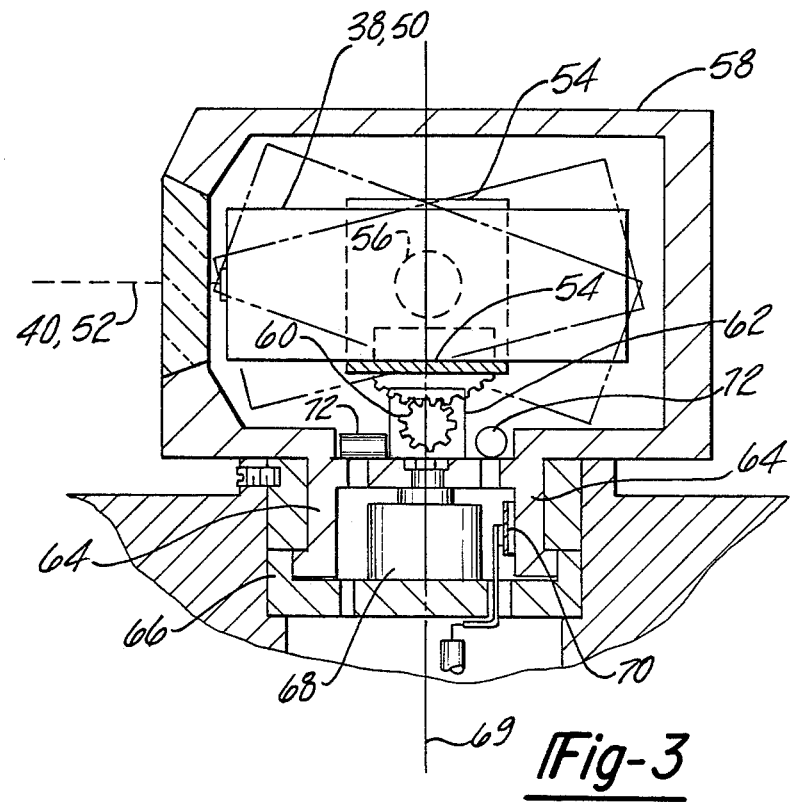
FIGS. 3 and 4 are sectional views taken through alternate forms of television camera apparatus usable in the FIG. 1 vehicle.

FIG. 1 illustrates a known military vehicle comprising a hull 10 having a front end 12 and rear end 14; the propulsion system is located in the vehicle rear end. Main gun 16 is located between two walls 20,20 that extend upwardly from a horizontal platform 22; platform 22 is rotatable around its central axis 24 to achieve gun motion in the azimuth plane. The gun is swingable around trunnion pins 18 to achieve gun motion in the elevational plane. Motor mechanisms (not shown) are provided to mechanically swing the gun and rotate the platform, as required to train the gun on enemy targets.

In the illustrated vehicle the ammunition rounds for the gun are taken from ammunition supplied in a circular basket 26 suspended from platform 22. For reloading purposes the gun is equipped with a swingable breech 27; a powered ball screw or similar power mechanism 28 within basket 26 transfers a live round of ammunition 30 upwardly into the breech, after which a hydraulic cylinder device on the gun swings the breech upwardly to a firing position. The loading operation is preferably performed automatically, but under human control from the gunner's station. In the illustrated vehicle the human gunner 32, driver 34 and commander 36 occupy seated positions alongside one another in the hull forwardly from basket 26. Other tank designs can be envisioned where the gunner, and/or driver and/or commander is/are stationed in basket 26 or behind basket 26. Basket 26 is an optional item; in some cases the basket could be omitted.

My invention is concerned with a system of television cameras for enabling the human gunner, driver and commander to individually view the surrounding terrain without requiring direct optical connections between the viewing window and the human technician. Each camera translates pictorial information into electric signals, which are transmitted through cables to a television receiver in front of the human commander, gunner, or driver. Use of the invention enables the terrain-observation devices (cameras) to be located in areas remote from the humans without adverse effects on the terrain-observation process. The invention enables the vehicle designer to locate the gunner, commander and driver stations according to other factors. Control system accessibility is one such factor. For example, if the human driver can be physically located near the propulsion system it may be possible to somewhat simplify the driver controls. Similarly, if the commander and gunner can be physically located near the ballistic computer controls and instruments it may be possible to simplify such controls and instrumentation; e.g. in the illustrated vehicle the ballistic computer can be located in the hull rather than in the rotary basket.

Another factor is human protection. If each human can be located in the hull, as opposed to the turret, it may be somewhat easier to protect the humans from enemy fire, with minimum added armor weight. Another factor is ease of voice communication. If some or all of the humans can be located alongside one another, as shown, they can readily communicate, with minimum possibility for misunderstandings. Also, there may be less need for controls redundancy, since it may not be necessary for the commander to override gunner operations if he is directly alongside the gunner.

Another factor to be considered is the need for adequate space for each human technician. If the vehicle designer is free to position the driver and/or commander and/or gunner in different locations within the vehicle he can better provide sufficient space for the human to sit, shift about, operate the controls, etc. without being cramped or restricted in his movements. In some cases, such added space may be helpful to the human should he be required to quickly escape from the vehicle through a hatch opening, e.g. if the vehicle is disabled by enemy fire.

The specific observation system shown in the drawing comprises a first driver-controlled television camera 38 located on the hull near its front end. The camera is swingably adjustable in the azimuth and elevational planes so that its line-of-sight 40 can scan the forward path of the vehicle and side areas into which the vehicle might be required to turn to avoid obstacles or seek shelter, e.g. behind a building, in a wooded area, etc. Camera adjustability in the elevational plane is primarily to compensate for vehicle pitching action. Camera 38 is cable-connected to a television receiver 42 located within hull 10 in front of driver 34; the driver can thus view the terrain area observed by camera 38. Electric controls at the driver station enable the driver to remotely adjust the camera in the azimuth and elevational planes. Azimuth adjustment would probably need to be only about ninety degrees on either side of a straight-ahead line-of-sight position. The driver station need not be in the forward section of the hull, e.g. the driver could be located behind ammunition basket 26.

The observation system shown in the drawing also includes a second television camera 44 located on rotary platform 22 directly below main gun 16. Camera 44 is affixed to platform 22 so that its line-of-sight 46 is oriented on the elevational plane of the gun-aiming axis; camera 44 can function as a gun sight. A laser range finder 48 is preferably located alongside of this camera. The camera is cable-connected to a second television receiver located in hull 10 directly in front of gunner 32. In FIG. 1 this second receiver is hidden by receiver 42.

The observation system further includes a third television camera 50 located at an elevated point on one of the gun cradle walls 20. This third camera is adjustable so that its line-of-sight 52 is movable in azimuth and elevational planes. The camera is able to scan through a three hundred sixty degree span in the azimuth plane. Electric cable means extends from camera 50 to a television receiver located in front of commander 36. In FIG. 1 this receiver is hidden by receiver 42. Electric control wiring extends from the commander station to camera 50 for enabling the commander to adjust the camera in the azimuth and elevational planes. Because of the rotary nature of platform 22 the cable and wiring for cameras 44 and 50 includes slip ring connections centered on rotational axis 24.

Figure 4:
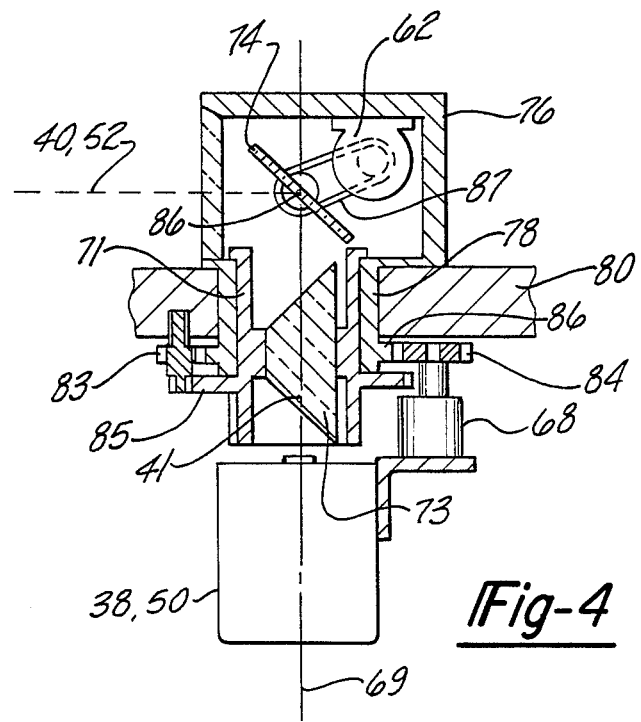

In the illustrated system cameras 50 and 38 are adjustable in the azimuth and elevational planes, whereas camera 44 is non-adjustable or adjustable only in the elevational plane. FIGS. 3 and 4 illustrate different ways for mounting cameras 50 and 38 to make them adjustable. In the FIG. 3 arrangement camera 50,38 is affixed to a U-shaped base 54 that has pivot pins 56 extending into circular holes in an armoured housing 58, i.e. a housing formed of armour plate. Base 54 carries a sector gear that meshes with a pinion gear 60 affixed to the shaft of an electric motor 62. Motor 62 operation moves the camera in the elevational plane.

Housing 58 includes a hollow cylindrical post 64 that has a rotary sliding fit in a socket structure 66. An electric motor 68 is mounted on the bottom wall of the socket structure with its output shaft suitably affixed to the housing-post assembly. Motor 68 operation rotates housing 58 and camera 62 in the azimuth plane, i.e. around central axis 69. Suitable openings are provided in the socket and housing for accommodating the motor lead wiring and camera cable. Slip ring devices 70 are required parts of the electric system. Gyroscopic mechanisms 72 may be positioned in housing 58 for use as sensor devices in a camera stabilization system (similar to stabilization systems already used for gun sights to minimize image jitter and blur). The motor lead wiring and camera cable extend from the FIG. 3 location to the commander station or driver station, depending on which camera is being considered. In the case of the commander's camera 50 the connections include slip rings centered on platform axis 24 for enabling the commander to adjust the camera in any position of platform 22 or any motion the platform might have at any one moment. Camera 50 is adjustable independently of platform 22.

FIG. 4 illustrates a different way in which to construct the adjustable camera assembly (38 or 50). In this case the camera is located in a stationary position within the vehicle armour. The external image is reflected by a mirror 74 downwardly along sight line 41 to the camera. Mirror 74 is located in an armoured housing 76 that has a cylindrical post 78 extending downwardly through a circular opening in support structure 80. Structure 80 may be the top plate of hull 10 or wall 20 on platform 22. Housing 76 is powered for rotary motion by means of a stationary motor 68. The motor shaft carries a pinion gear 84 in mesh with a ring gear 86 carried on post 78. Operation of motor 68 causes housing 76 and mirror 74 to rotate around central axis 69. To avoid undesired rotation of the image when motor 68 is in operation the optical system may include a de-rotation prism 73 suitably mounted in circular tube 71. Tube 71 has a rotary fit within hollow post 78. Idler gear means 83 is engaged with ring gear 86 on post 78 and a second ring gear 85 on tube 71 for fixing the image orientation in any rotated position of housing 76. The gear system operates like gear system 104,106 in U.S. Pat. No. 3,309,962 issued to C. W. Lykam. My invention is not concerned with the de-rotation prism or its action.

Mirror 74 is mounted within housing 76 for adjusting movements around pivot axis 86. Motor 62 operates a chain or belt 87 to power mirror 74 around pivot axis 86 in the elevation plane. The systems of FIGS. 3 and 4 operate in generally the same fashion. One system is considered an alternate to the other.

In use of the three-camera observation system, driver 34 exerts primary control over camera 38 in the sense that he manipulates the hand controls that supply currents to adjustment motors 62 and 68 for the camera 38 system. The scene viewed by camera 38 appears on the television receiver screen at the driver station. Commander 36 manipulates the hand controls for motors 62 and 68 associated with camera 50. The commander is thus able to remotely view the entire scene surrounding the vehicle for the purpose of locating potential enemy targets or enemy weapons, i.e. target acquisition. Gunner 32 views the television screen associated with camera 44 for gun-aiming and gun-firing purposes. The platform 22 motor and the gun-elevating motor are jointly controlled by the gunner and/or the commander in conventional known fashion.

Commander 36 and gunner 32 interact in the target acquisition-target tracking function. Generally the commander seeks out new targets (using camera 50) while the gunner (using camera 44) tracks and fires on targets previously located by the commander. The ballistic computer can be used to store target-location information for easing the gunner's job. For example, a target-location button at the commander's station can be depressed to record the absolute orientation of camera 50 at the instant when the commander locks camera 50 onto a potential target. The absolute camera 50 line-of-sight information can thereby be put into the ballistic computer memory for later use by the gunner when the main gun has completed one gun-firing sequence and is ready for the next firing sequence. Target tracking may be accomplished manually by the gunner, using information from the ballistic computer memory. Alternately it may be feasible to have the computer automatically generate control signals for driving the main gun to the next target without gunner input or assistance. Final lay-on of the gun to the target would probably be accomplished by the gunner, with the aid of his camera and the ballistic computer. Use of a computer to aim the gun is already known; such computers take into account a variety of factors, such as cross wind, range, ammunition temperature, target elevation, etc.

Versatility of the observation system may be enhanced by adding selector switches so that at least the gunner and commander can use each other's cameras. For example, auxiliary wiring and selector switches could be provided between the two receivers so that an electrical input to commander's television receiver could also be applied to the input at the gunner's television receiver. Similarly, auxiliary wiring and selector switch means could be provided for applying the gunner's camera signal to the commander's television receiver. With such a system both the commander and gunner could at any one instant view the same scene or different scenes. In the event that the commander or gunner should become incapacitated the other could at least partially take over the disabled person's function with minimum loss of time and effectiveness.

The television receivers would preferably have features suited to their specific functions, e.g. a zoom lens adjustment capability for enhancing image detail, and/or high resolution image-background contrast enhancement feature, and/or day and night lens system adjustment, and/or variable field-of-view, and/or color display capability.

The drawings show an arrangement in which the driver, gunner and commander are all seated near the front end of the vehicle hull. However, when the television camera type observation system is used any one of the human occupants could be seated elsewhere, e.g. in basket 26 or behind basket 26. Use of the television camera system would obviate the need for vision blocks or periscope structures now commonly used in military vehicles. However the camera system could be used to only partially supplant conventional observation systems. For example, a system is envisioned in which the driver uses vision blocks to view the forward terrain, as under present practice. In such a system camera 38 and its associated receiver would be omitted; television cameras 44 and 50 would be used by the gunner and commander in the fashion previously described.

The illustrated system is somewhat similar to a television viewer system developed by AAI Corp. for use on a U.S. military vehicle known as the high survivability test vehicle (HSTVL). However, in that vehicle the gunner's camera was located in an exposed position alongside the gun, whereas camera 44 (and laser range finder 48) in the present disclosure is/are located in a protected position beneath the gun. Also in the HSTVL vehicle the commander's television camera was located at a central point on the roof of a gun turret, rather than on one of the gun cradle walls, as disclosed herein. In the HSTVL vehicle the driver's view of the terrain was through vision blocks located in the forward area of the hull; the present disclosure includes a television camera 38 for driver terrain observation purposes.

I wish it to be understood that I do not desire to be limited to the exact details of construction shown and described for obvious modifications will occur to a person skilled in the art, without departing from the spirit and scope of the appended claims.

I claim:

1. In a military ground vehicle that includes a hull having front and rear ends, a gun platform centrally mounted on the hull for rotational motion in the azimuth plane, two laterally-spaced gun-cradle walls extending upwardly from the platform, and a main gun centrally located in the space between said cradle walls for swinging ajustments in the elevational plane: the improvement comprising a first driver-controlled television camera located on the hull near its front end; means for adjusting said first camera so that its line-of-sight is movable in the azimuth and elevational planes; a first television receiver located within the hull at the driver's station; first cable connections between the first camera and first receiver, whereby the driver is enabled to view the terrain in front of the vehicle; a second television camera located on the rotary platform between the gun cradle walls and directly below the main gun, with its line-of-sight oriented on the elevational plane of the gun-aiming axis; a second television receiver located within the hull at the gunner's station; second cable connections between the second camera and second receiver whereby the gunner is enabled to train the gun on targets within the second camera field-of-view; a third commander-controlled television camera located at an elevated point on one of the gun cradle walls; means for adjusting said third camera so that its light-of-sight is movable in the aximuth and elevational planes; a third television receiver located within the hull at the commander's station; and cable connections between the third camera and third receiver whereby the commander is enabled to seek new targets while the gunner is firing the main gun at a previously-selected target.

2. The improvement of claim 1, and further comprising first auxiliary cable connections whereby the third receiver is enabled to selectively receive picture signals from the second and third cameras, and second auxiliary cable connections whereby the second receiver is enabled to selectively receive picture signals from the second and third cameras.

3. The improvement of claim 1 wherein the third television camera is located on the extreme upper edge of said one gun cradle wall, whereby the line-of-sight is unobstructed by the gun cradle walls throughout adjusting movement of said third camera in the azimuth plane.

* * * * *